United States Patent
Mishra et al.

(10) Patent No.: US 10,645,201 B2
(45) Date of Patent: May 5, 2020

(54) PACKET HANDLING DURING SERVICE VIRTUALIZED COMPUTING INSTANCE MIGRATION

(71) Applicant: VMware, Inc., Palo Alto, CA (US)

(72) Inventors: Rahul Mishra, Palo Alto, CA (US); Jayant Jain, Palo Alto, CA (US); Pierluigi Rolando, Palo Alto, CA (US); Kantesh Mundaragi, Palo Alto, CA (US); Raju Koganty, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/051,048

(22) Filed: Jul. 31, 2018

(65) Prior Publication Data

US 2020/0045148 A1 Feb. 6, 2020

(51) Int. Cl.
*H04L 29/06* (2006.01)
*H04L 12/751* (2013.01)
*G06F 9/455* (2018.01)
*H04L 12/46* (2006.01)

(52) U.S. Cl.
CPC .......... *H04L 69/22* (2013.01); *G06F 9/45558* (2013.01); *H04L 12/4633* (2013.01); *H04L 12/4641* (2013.01); *H04L 45/02* (2013.01); *G06F 2009/4557* (2013.01); *G06F 2009/45595* (2013.01)

(58) Field of Classification Search
CPC ....................................................... H04L 69/22
USPC ........................................................ 370/392
See application file for complete search history.

(56) References Cited

U.S. PATENT DOCUMENTS

| | | | |
|---|---|---|---|
| 9,401,865 B2* | 7/2016 | Morimoto | ........... H04L 12/4641 |
| 9,491,063 B2 | 11/2016 | Kempf et al. | |
| 2003/0156559 A1* | 8/2003 | Yi | .......................... H04W 36/10 370/331 |
| 2010/0098085 A1* | 4/2010 | Wu | ......................... H04L 45/00 370/392 |
| 2014/0365680 A1* | 12/2014 | van Bemmel | .......... H04L 29/06 709/232 |
| 2015/0281054 A1* | 10/2015 | Utgikar | ................... H04L 49/70 709/221 |
| 2015/0370586 A1 | 12/2015 | Cooper et al. | |

(Continued)

*Primary Examiner* — Peter G Solinsky
(74) *Attorney, Agent, or Firm* — Su IP Consulting

(57) ABSTRACT

Example methods are provided for packet handling during service virtualized computing instance migration in a software-defined networking (SDN) environment. The method may comprise configuring first reachability information to associate a first service virtualized computing instance with an active role, and second reachability information to associate a second service virtualized computing instance with a standby role. In response to determination that a switchover is required to facilitate a migration of the first service virtualized computing instance, the first reachability information may be updated to associate the first service virtualized computing instance with the standby role, and the second reachability information to associate the second service virtualized computing instance with the active role. The method may also comprise: in response to detecting a completion of the migration, updating the first reachability information to associate the first service virtualized computing instance with a target host instead of a source host.

21 Claims, 6 Drawing Sheets

(56) References Cited

U.S. PATENT DOCUMENTS

| | | | |
|---|---|---|---|
| 2015/0372840 A1 | 12/2015 | Benny et al. | |
| 2016/0036703 A1* | 2/2016 | Josyula | H04L 45/66 370/392 |
| 2016/0226794 A1 | 8/2016 | Rao | |
| 2016/0285706 A1 | 9/2016 | Rao | |
| 2016/0308690 A1* | 10/2016 | Chanda | H04L 12/4633 |
| 2016/0337329 A1 | 11/2016 | Sood et al. | |
| 2017/0054630 A1* | 2/2017 | Liang | H04L 45/22 |
| 2017/0060708 A1* | 3/2017 | Narang | G06F 11/2033 |
| 2017/0063672 A1* | 3/2017 | Chhabra | H04L 41/0663 |
| 2017/0078216 A1 | 3/2017 | Adolph et al. | |
| 2017/0201323 A1* | 7/2017 | Prakash | H04Q 11/0001 |
| 2018/0176120 A1* | 6/2018 | Katz | G06F 9/5061 |
| 2018/0196685 A1 | 7/2018 | Dorr et al. | |
| 2018/0248785 A1* | 8/2018 | Dubey | H04L 45/28 |
| 2018/0367387 A1 | 12/2018 | Kompella et al. | |
| 2019/0028577 A1* | 1/2019 | D?Souza | H04L 69/40 |
| 2019/0132221 A1 | 5/2019 | Boutros et al. | |

\* cited by examiner

200

Host requiring service provided by SVM1 and SVM2
(e.g., Host-A 110A)

Configure first reachability information to associate SVM1 with active role and source host
210

Configure second reachability information to associate SVM2 with standby role
220

Determine that switchover is required to facilitate migration of SVM1 from source host to target host
230

Update first reachability information to associate SVM1 with standby role and second reachability information to associate SVM2 with active role
240

Forward packet requiring service to SVM2 based on second reachability information
250

Update first reachability information to associate SVM1 with target host in response to detecting completion of migration
260

Fig. 2

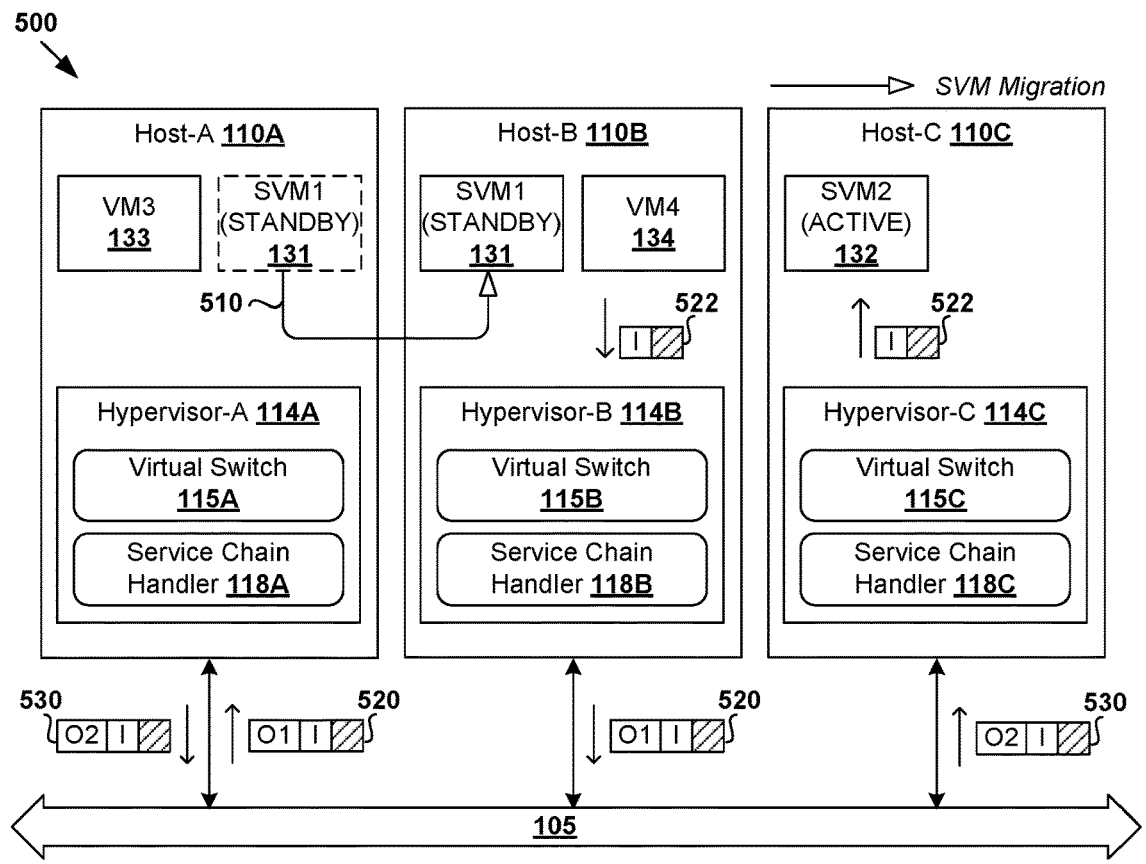
Reachability information table (SPI table) at Host-A 110A  420
| (SPI, SI) | SVM ID | Role | VNI | MAC address | VTEP information | |
|---|---|---|---|---|---|---|
| (20, 1) | SVM1 | [[ACTIVE]] STANDBY | 100 | MAC-1 | [[(VTEP-A, VTEP IP = IP-A)]] (VTEP-B, VTEP IP = IP-B) | ↙ 421 |
| (20, 1) | SVM2 | [[STANDBY]] ACTIVE | 100 | MAC-2 | (VTEP-C, VTEP IP = IP-C) | ↙ 422 |
↑ 512
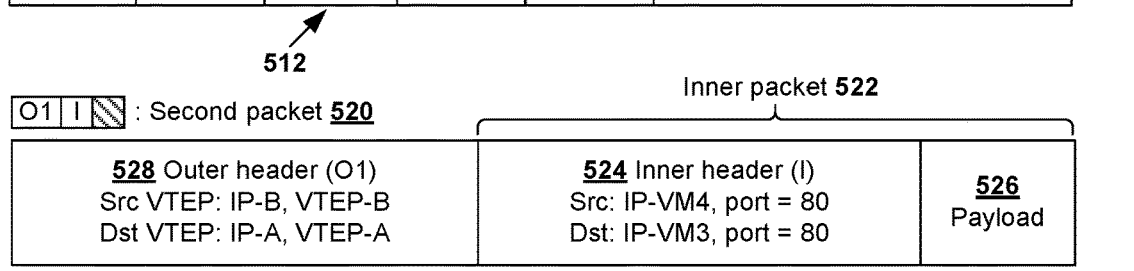
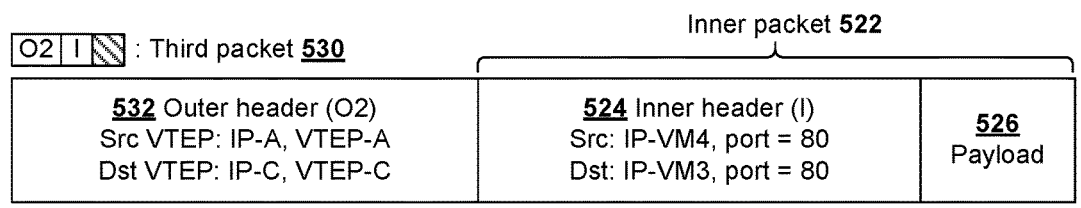
Fig. 5

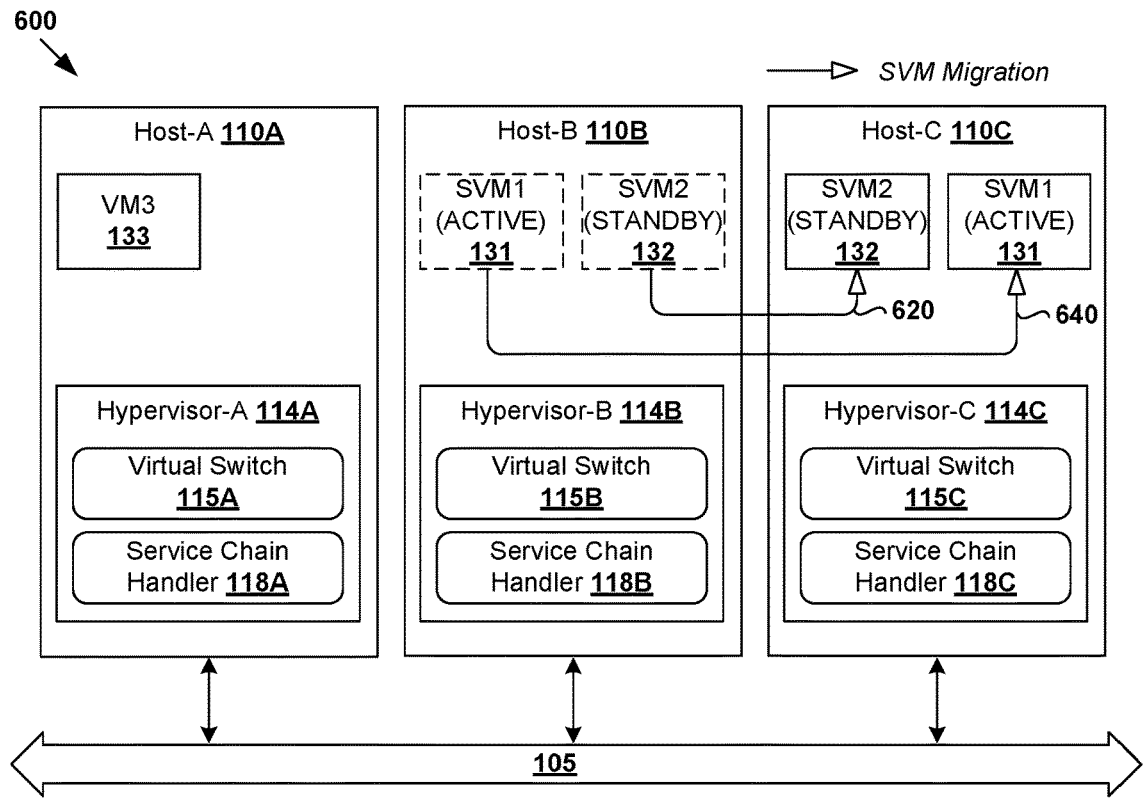

Reachability information table at Host-A 110A (before migration of SVM1 and SVM2) 610

| (SPI, SI) | SVM ID | Role | VNI | MAC address | VTEP information | |
|---|---|---|---|---|---|---|
| (20, 1) | SVM1 | ACTIVE | 100 | MAC-1 | (VTEP-B, VTEP IP = IP-B) | 611 |
| (20, 1) | SVM2 | STANDBY | 100 | MAC-2 | (VTEP-B, VTEP IP = IP-B) | 612 |

Reachability information table at Host-A 110A (during and after migration of SVM2) 630

| (SPI, SI) | SVM ID | Role | VNI | MAC address | VTEP information | |
|---|---|---|---|---|---|---|
| (20, 1) | SVM1 | ACTIVE | 100 | MAC-1 | (VTEP-B, VTEP IP = IP-B) | 611 |
| (20, 1) | SVM2 | STANDBY | 100 | MAC-2 | [[(VTEP-B, VTEP IP = IP-B)]] (VTEP-C, VTEP IP = IP-C) | 631 |

Reachability information table at Host-A 110A (during and after migration of SVM1) 650

| (SPI, SI) | SVM ID | Role | VNI | MAC address | VTEP information | |
|---|---|---|---|---|---|---|
| (20, 1) | SVM1 | [[ACTIVE]] STANDBY | 100 | MAC-1 | [[(VTEP-B, VTEP IP = IP-B)]] (VTEP-C, VTEP IP = IP-C) | 651 |
| (20, 1) | SVM2 | [[STANDBY]] ACTIVE | 100 | MAC-2 | (VTEP-C, VTEP IP = IP-C) | 652 |

Fig. 6

PACKET HANDLING DURING SERVICE VIRTUALIZED COMPUTING INSTANCE MIGRATION

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, service virtualized computing instances (e.g., service VMs) may be deployed to provide a range of services to other VMs in the SDN environment. However, when migration of a service virtualized computing instance is required, service disruption generally occurs during the migration, which adversely affects network performance.

BRIEF DESCRIPTION OF DRAWINGS

FIG. 2 is a flowchart of an example process for a host to perform packet handling during service virtualized computing instance migration in an SDN environment;

FIG. 5 is a schematic diagram illustrating example packet handling during the migration of the service virtualized computing instance in FIG. 4; and FIG. 6 is a schematic diagram illustrating example packet handling during migration of multiple service virtualized computing instances in an SDN environment.

DETAILED DESCRIPTION

Figure 1:
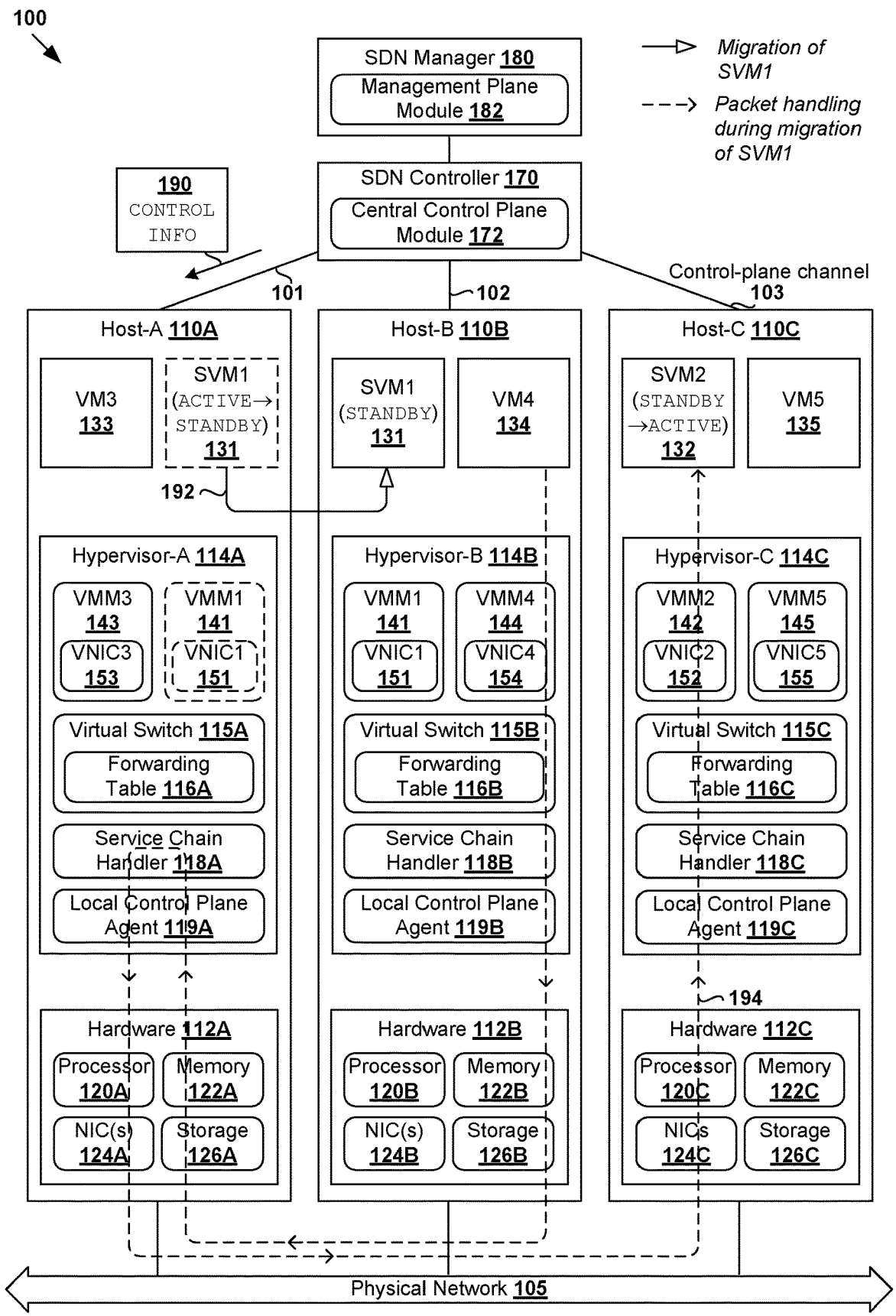
FIG. 1 is a schematic diagram illustrating an example Software-Defined Networking (SDN) environment in which packet handling may be performed during service virtualized computing instance migration.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Various challenges relating to service virtualized computing instances will now be explained in more detail using FIG. 1, which is a schematic diagram illustrating example Software-Defined Networking (SDN) environment 100 in which packet handling may be performed during service virtualized computing instance migration. It should be understood that, depending on the desired implementation, examples of the present disclosure may be implemented in any suitable network environment other than SDN environment 100. In practice, SDN environment 100 may include additional and/or alternative components than that shown in FIG. 1.

In the example in FIG. 1, SDN environment 100 includes multiple hosts, such as host-A 110A, host-B 110B and host-C 110C that are inter-connected via physical network 105. Each host 110A/110B/110C includes suitable hardware 112A/112B/112C and virtualization software (e.g., hypervisor-A 114A, hypervisor-B 114B, hypervisor-C 114C) to support various virtual machines (VMs) 131-135. In practice, SDN environment 100 may include any number of hosts (also known as a "host computers", "host devices", "physical servers", "server systems", "transport nodes," etc.), where each host may be supporting tens or hundreds of VMs. Hypervisors 114A-C may each implement any suitable virtualization technology, such as VMware ESX® or ESXi™ (available from VMware, Inc.), Kernel-based Virtual Machine (KVM), etc.

Hypervisor 114A/114B/114C maintains a mapping between underlying hardware 112A/112B/112C and virtual resources allocated to respective VMs 131-135. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 126A/126B/126C, etc. Virtual resources are allocated to each VM to support a guest operating system (OS) and applications (not shown for simplicity). Corresponding to hardware 112A/112B/112C, the virtual resources may include virtual CPU, guest physical memory, virtual disk, virtual network interface controller (VNIC), etc. Hardware resources may be emulated using virtual machine monitors (VMMs) 141-145, which may be considered as part of corresponding VMs 131-135, or alternatively, separated from VMs 131-135. In the example in FIG. 1, VNICs 151-155 are emulated by corresponding VMMs 141-145. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 114A/114B/114C further implements virtual switch 115A/115B/115C and a logical distributed router (DR) instance (not shown for simplicity) to handle egress packets from, and ingress packets to, corresponding VMs 131-135. In SDN environment 100, logical switches and logical distributed routers may be implemented in a distributed manner and can span multiple hosts to connect VMs 131-135. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical distributed routers that provide logical layer-3 connectivity may be implemented collectively by DR instances and represented internally using routing tables (not shown for simplicity) at respective DR instances. Routing tables may each include entries that collectively implement the respective logical distributed routers.

Virtual switch 115A/115B/115C maintains any suitable information to forward packets to and from corresponding VMs 131-135. Packets are received from, or sent to, each VM via an associated logical port. The term "packet" may refer generally to a group of bits that can be transported together, and may be in another form, such as "frame," "message," "segment," etc. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

As used herein, the term "logical port" may refer generally to a port on a logical switch to which a virtualized computing instance is connected. A "logical switch" may refer generally to an SDN construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Through SDN, benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. SDN controller 170 and SDN manager 180 are example network management entities that facilitate implementation of logical networks in SDN environment 100. One example of an SDN controller is the NSX controller component of VMware NSX® (available from VMware, Inc.) that may be a member of a controller cluster (not shown) and configurable using SDN manager 180. One example of an SDN manager is the NSX manager component that provides an interface for end users to perform any suitable configuration in SDN environment 100.

SDN controller 170 and SDN manager 180 support central control plane module 172 and management plane module 182, respectively. To send and receive the control information (e.g., configuration information), each host 110A/110B/110C may implement local control plane (LCP) agent 119A/119B/119C to interact with SDN controller 170. For example, control-plane channel 101/102/103 may be established between SDN controller 170 and host 110A/110B/110C using TCP over Secure Sockets Layer (SSL), etc. Management entity 170/180 may be implemented using physical machine(s), virtual machine(s), a combination thereof, etc.

A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM3 133 on host-A 110A and VM4 134 on host-B 110B may be located on the same logical layer-2 segment, such as VXLAN segment with VXLAN network identifier (VNI)=200.

Each host 110A/110B/110C also maintains data-plane connectivity with other host(s) via physical network 105 to facilitate communication among VMs located on the same logical overlay network. Hypervisor 114A/114B/114C may implement a virtual tunnel endpoint (VTEP) to encapsulate and decapsulate packets with an outer header (also known as a tunnel header) identifying the relevant logical overlay network (e.g., VNI=100). For example in FIG. 1, hypervisor-A 114A implements a first VTEP associated with (IP address=IP-A, MAC address=MAC-A, VTEP label=VTEP-A, VTEP IP=IP-A), hypervisor-B 114B implements a second VTEP with (IP-B, MAC-B, VTEP-B) and hypervisor-C 114C implements a third VTEP with (IP-C, MAC-C, VTEP-C). Encapsulated packets may be sent via an end-to-end, bi-directional communication path (known as a tunnel) between a pair of VTEPs over physical network 105.

In SDN environment 100, example service virtualized computing instances in the form of service virtual machines (SVMs) may be chained or grouped together to form a "service chain" that provides service(s) to other guest VMs. A service chain may be represented using S={$SVM_j$}, where j=1, . . . ,N to implement a sequence of N≥2 services. A service chain may be identified using a service path identifier (SPI), and a particular service within the service chain using a service identifier (SI). In the case of N=3, three services may be provided by respective SVMs (not all shown in FIG. 1 for simplicity). In this case, the SVMs may be identified using (SPI=20, SI=1), (SPI=20, SI=2), and (SPI=20, SI=3), respectively. Using the service chain, a stream of packets destined for a destination may be processed by the SVMs before the packets (e.g., in a processed form or their original form) are forwarded to the destination.

As used herein, the term "service chain" may refer generally to a chain of multiple SVMs providing respective service(s). For example, a service chain may represent an instantiation of a set of service functions through which traffic is steered. The term "service virtualized computing instance" (also known as "infrastructure virtualized computing instance") may refer generally to any suitable virtualized computing instance (e.g., "service virtual machine")

that is configured to provide a "service." The term "service" may include any suitable operation(s) that may be performed by a service virtualized computing instance, including but not limited to networking service(s) such as firewall, load balancing, network address translation (NAT), intrusion detection, deep packet inspection (DPI), traffic shaping, traffic optimization, packet header enrichment or modification, packet tagging, content filtering, etc. It should be understood that the operation(s) associated with a service may or may not modify the content (e.g., header(s) or payload) of the packets. Depending on the desired implementation, a service chain may include SVM(s) that are configured to perform non-networking service(s), etc.

In the example in FIG. 1, SVM1 131 may provide a networking service to other VMs 133-135 in SDN environment 100, such as a firewall service to allow or deny packets that originate from, or destined for, VMs 133-135. In the following, consider a scenario where source VM4 134 supported by host-B 110B sends packets to destination VM3 133 supported by host-A 110A. Prior to forwarding the packets to destination VM3 133, the packets may be forwarded to SVM1 131 for processing. If allowed by SVM1 131, the packets will be forwarded to destination VM3 133. Otherwise, if denied, the packets will be dropped.

Conventionally, service disruption generally occurs during the migration of SVM1 131, such as from source host-A 110A to target host-B 110B. Since SVM1 131 may provide a service to a large number of VMs in SDN environment 100, one second of service disruption during the migration may lead to packet loss that affects hundreds or thousands of VMs. This conventional approach adversely affects network performance, which is undesirable.

Active and Standby SVMs

According to examples of the present disclosure, packet handling during SVM migration may be improved using a pair of SVMs 131-132. In particular, SVM1 131 may be associated with an active role, and second SVM2 132 with a standby role. When migration of SVM1 131 is required, a switchover from SVM1 131 to SVM2 132 may be performed. This way, the likelihood of service disruption and packet loss may be reduced, if not eliminated. Once migrated, reachability information may be updated to associate SVM1 131 with target host-B 110B instead of source host-A 110A.

Throughout the present disclosure, various examples will be described using SVM1 131 as an example "first service virtualized computing instance," SVM2 132 as example "second service virtualized computing instance," host-A 110A as example "source host" from which SVM1 131 is migrated, host-B 110B as "target host" to which SVM1 131 is migrated, and SDN controller 170 as example "management entity." It should be understood that examples of the present disclosure may be performed by any suitable host 110A/110B/110C that requires a service provided by SVM1 131 and SVM2 132.

In more detail, FIG. 2 is a flowchart of example process 200 to perform packet handling during service virtualized computing instance migration in SDN environment 100. Example process 200 may include one or more operations, functions, or actions illustrated by one or more blocks, such as 210 to 260. The various blocks may be combined into fewer blocks, divided into additional blocks, and/or eliminated depending on the desired implementation. Example process 200 may be implemented by host 110A/110B/110C using any suitable module(s) or component(s), such as service chain handler 118A/118B/118C.

At 210 and 220 in FIG. 2, first reachability information associated with SVM1 131 and second reachability information associated with SVM2 132 may be configured. For example in FIG. 1, first reachability information may be configured to associate SVM1 131 with an active role and source host=host-A 110A supporting SVM1 131. Second reachability information may be configured to associate SVM2 132 with a standby role. Both SVM1 131 and SVM2 132 are configured to provide a particular packet processing service (e.g., firewall service). As will be discussed using FIG. 3 and FIG. 4, the configuration at blocks 210-220 may be performed based on control information received from SDN controller 170. See corresponding 190 in FIGS. 1.

At 230 and 240 in FIG. 2, in response to determination that a switchover is required to facilitate a migration of SVM1 131 from source host=host-A 110A to target host=host-B 110B (see 192 in FIG. 1), the first reachability information and second reachability information may be updated to associate SVM1 131 with the standby role, and SVM2 132 with the active role. As will be discussed further using FIG. 3 and FIG. 4, the determination at block 230 may involve receiving a notification (e.g., function callback) associated with the migration from SVM1 131, the source host or SDN controller 170.

At 250 in FIG. 2, packet handling during the migration of SVM1 131 may be performed based on the updated second reachability information. In particular, any packet requiring the packet processing service may be forwarded to SVM2 132 instead of SVM1 131 (see 194 in FIG. 1). Depending on the desired implementation, block 250 may include matching the packet with a packet processing rule that is associated with service identification information (e.g., SPI and SI) identifying the packet processing service provided by both SVM1 131 and SVM2 132. In this case, the second reachability information may be retrieved based on the packet processing rule and service identification information.

At 260 in FIG. 2, in response to detecting a completion of the migration of SVM1 131 (see 192 in FIG. 1), the first reachability information may be further updated to associate SVM1 131 with target host=host-B 110B instead of source host=host-A 110A. For example, prior to the migration, the first reachability information may specify VTEP information associated with source host=host-A 110A. Once the migration is completed, the first reachability information may be updated to specify VTEP information associated with target host=host-B 110B.

According to examples of the present disclosure, service disruption may be reduced, if not avoided, by configuring SVM1 131 and SVM2 132 as a high availability (HA) pair. In practice, SVM1 131 and SVM2 132 may be implemented using any suitable approach. For example, SVM1 131 and SVM2 132 may reside on the same logical overlay network (e.g., VNI=100 in FIG. 4), or different ones. SVM1 131 and SVM2 132 may reside on different hosts (see FIGS. 4-5), or the same host (see FIG. 6). Further, SVM1 131 and SVM2 132 may reside on the same geographical site, or different ones. Packets requiring the service provided by SVM1 131 and SVM2 132 will be forwarded to the appropriate SVM associated with the active role. In the following, various examples will be discussed using FIG. 1 to FIG. 6.

Configuration

Figure 3:
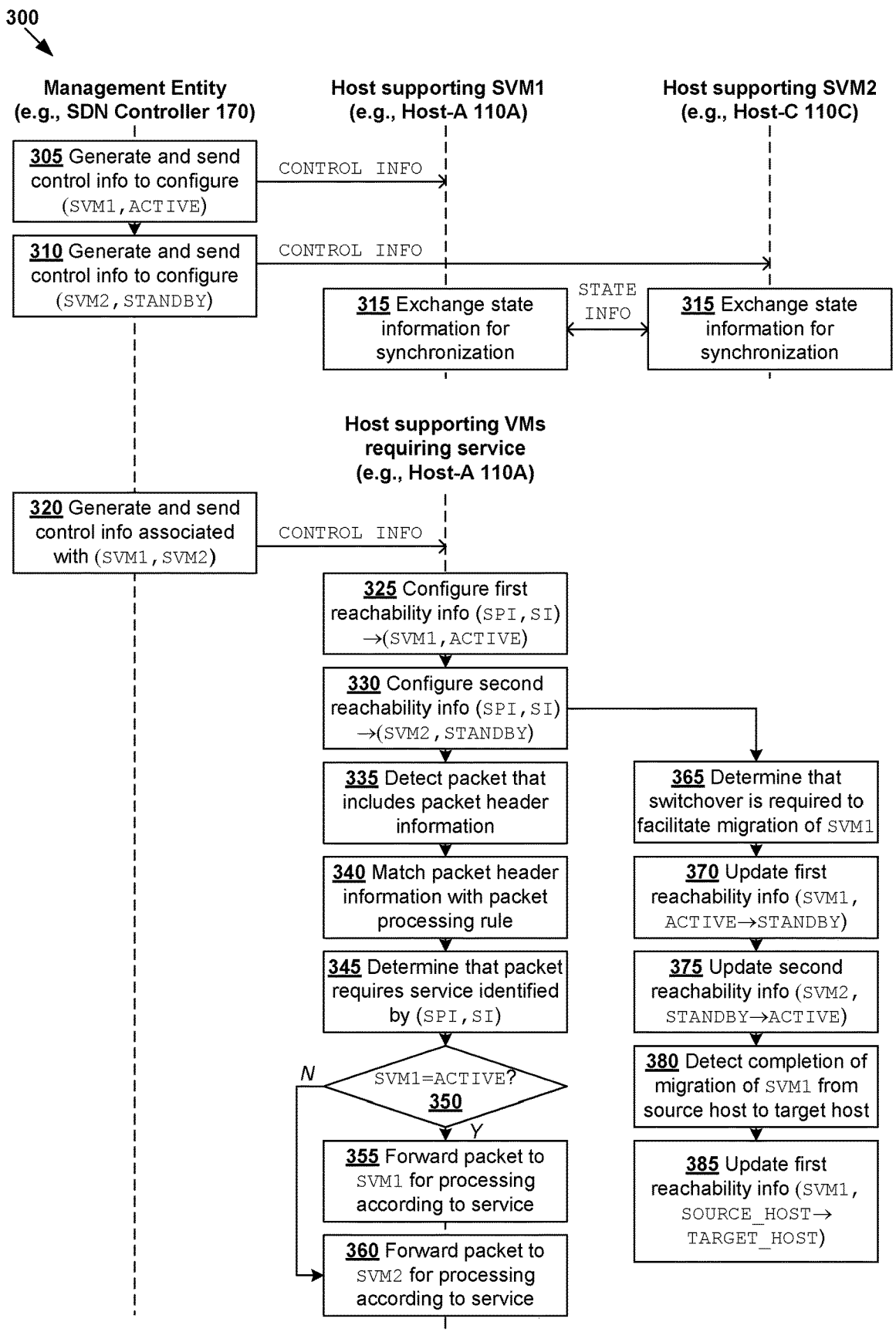
FIG. 3 is a flowchart of an example detailed process for a host to perform packet handling during service virtualized computing instance migration in an SDN environment.

FIG. 3 is a flowchart of example detailed process 300 for packet handling during service virtualized computing instance migration in SDN environment 100. Example process 300 may include one or more operations, functions, or actions illustrated at 310 to 385. The various operations, functions or actions may be combined into fewer blocks, divided into additional blocks, and/or eliminated depending on the desired implementation. Example process 300 may be implemented by SDN controller 170 using central control plane module 172, and host 110A/110B/110C using any suitable module(s), such as virtual switch 115A/115B/115C, service chain handler 118A/118B/118C, LCP agent 119A/119B/119C, any combination thereof, etc.

Figure 4:
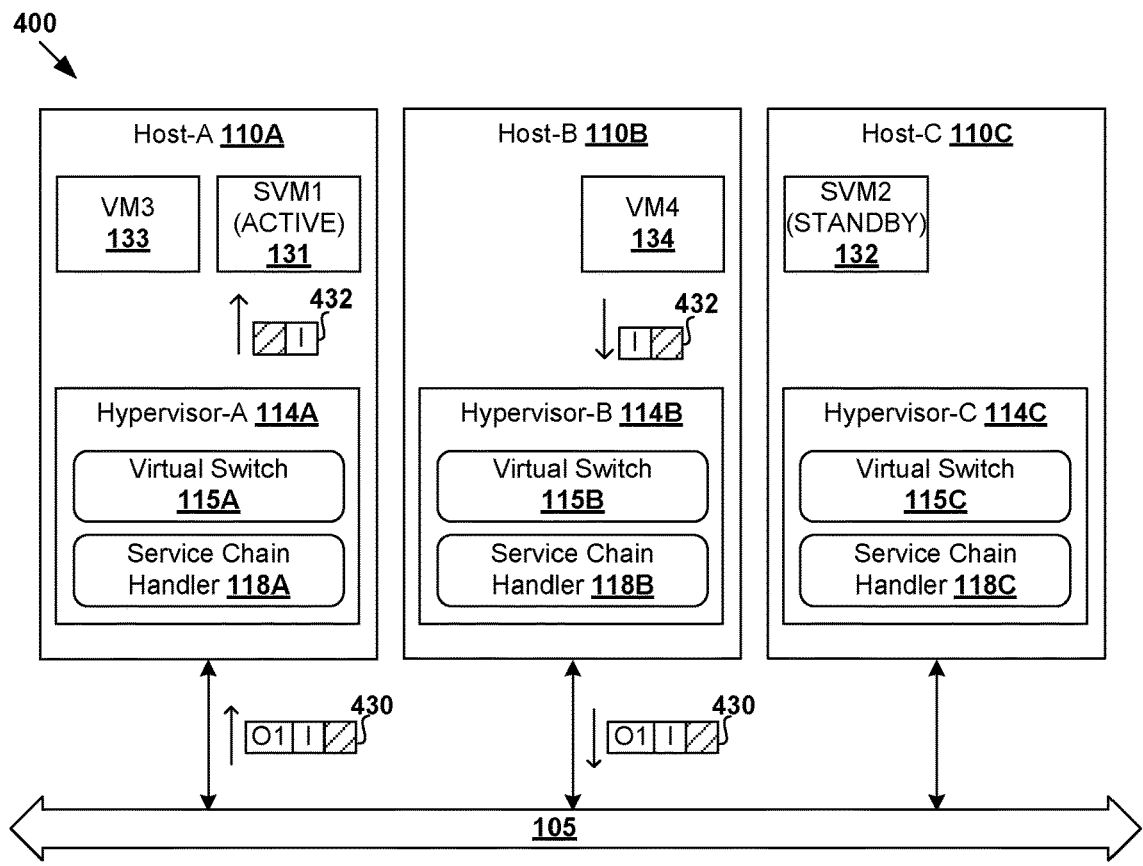
FIG. 4 is a schematic diagram illustrating example packet handling before a migration of a service virtualized computing instance associated with an active role in an SDN environment.

FIG. 3 will be explained using FIG. 4 and FIG. 5. In particular, FIG. 4 is a schematic diagram illustrating example packet handling 400 before a migration of service virtualized computing instance 131 associated with an active role in SDN environment 100. FIG. 5 is a schematic diagram illustrating example packet handling 500 during the migration of service virtualized computing instance 131 in FIGS. 4.

At 305 and 310 in FIG. 3, SDN controller 170 configures a cluster in the form of a HA pair to provide a particular service (e.g., firewall service) to other VMs 133-135 in SDN environment 100. Using the example in FIG. 1, the pair includes SVM1 131 supported by host-A 110A and SVM2 132 supported by host-C 110C. SVM1 131 may be assigned with an active role (also known as primary role), while SVM2 132 with a standby role (also known as secondary role).

Depending on the desired implementation, a HA pair of SVMs 131-132 may be deployed in different fault domains. In practice, a "fault domain" may refer to a datacenter, host, pod, rack and chassis, etc. For example, a chassis may refer to an enclosure in which one or more hosts are mounted (e.g., depending on the vendor's specification). A rack (e.g., server rack) may include one or more chassis stacked to make efficient use of space and position within a pod. A pod may be a modular unit of datacenter with a set of resources or infrastructure to service one or more racks. A datacenter may be a collection of hosts housed in one or more pods, racks and chassis. Any alternative and/or additional fault domains may be used.

Although exemplified using a pair of SVMs 131-132, it should be understood that any suitable number of SVMs may be grouped together to form a cluster at blocks 305-310. Depending on the desired implementation, a cluster of three or more SVMs may be configured. In this case, there might be one SVM or multiple SVMs that are assigned with the active role, while other SVM(s) are assigned with the standby role. The SVMs may reside on any suitable fault domain(s), logical overlay network(s), etc.

At 315 in FIG. 3, SVMs 131-132 may exchange state information for heartbeat exchange and synchronization purposes. For example, state information relating to runtime configuration relating to the service may be exchanged. In practice, SVMs 131-132 may communicate via a HA link or out-of-band interface (not shown for simplicity). Depending on the desired implementation, SVMs 131-132 may be connected to an out-of-band logical forwarding element (e.g., logical switch or logical router) via a HA interface assigned with a private IP address (i.e., does not consume any publicly routable IP address).

At 320, 325 and 330 in FIG. 3, in response to receiving control information associated with SVMs 131-132 from SDN controller 170, host-A 110A configures reachability information associated with SVMs 131-132. In practice, the control information may be received by host-A 110A via a connection between LCP agent 119A and SDN controller 170 over control-plane channel 101 (see 190 in FIG. 1). In the example in FIG. 4, host-A 110A has access to packet processing rule table 410 that includes various packet processing rules. One example is packet processing rule 411 that specifies match fields (source IP address=any, source port=any, destination IP address=IP-VM3, destination port=80, protocol=TCP) and action=redirect to service chain associated with service identification information (SPI=20, SI=1).

According to rule 411, packet redirection will be performed in response to detecting a packet that matches with the match fields. The "reachability information" may be stored in any suitable data structure(s), such as SPI table 420, etc. In the example in FIG. 4, SPI table 420 includes two entries 421-422 associated with respective SVMs 131-132. First entry 421 ("first reachability information") specifies a first mapping between (SPI=20, SI=1) and (ID=SVM1, role=ACTIVE, VNI=100, MAC address=MAC-1, VTEP label=VTEP-B, VTEP IP=IP-B) associated with SVM1 131. Second entry 422 ("second reachability information") specifies a second mapping between (SPI=20, SI=1) and (ID=SVM2, role=STANDBY, VNI=100, MAC address=MAC-2, VTEP label=VTEP-C, VTEP IP=IP-C) associated with SVM2 132. According to packets matching rule 411 and entries 421-422, packets requiring the service identified by (SPI=20, SI=1) will be forwarded to SVM1 131 with role=ACTIVE, instead of SVM1 132 with role=STANDBY.

In practice, the "SVM ID" field in entries 421-422 may be any suitable identifier (ID), such as layer-2 address (e.g., MAC address), layer-3 address (IP address), shared memory device ID, etc. Although not shown for simplicity, SVMs 131-132 may be part of a service chain that includes additional SVMs. The match fields in packet processing rule 411 may specify any suitable packet header information, such as layer-2 information (e.g., source and destination MAC addresses), layer-3 information (source and destination IP addresses), layer-4 information (e.g., source and destination port numbers, protocols or services), upper-layer information (e.g., layer-7 information generated by an application), any combination thereof, etc.

Depending on the desired implementation, packet processing rule table 410 and SPI table 420 may be maintained by a classifier and kernel module implemented by hypervisor-A 114A, respectively. One example of the classifier is the VMware Internetworking Service Insertion Platform (VSIP) component of VMware NSX® (available from VMware, Inc.). In this case, the kernel module may be the Network Security Monitoring (NSM) component, or the Distributed Virtual Filter (DVFilter) component of VMware NSX®. The NSM component may be configured to perform NIC-based packet delivery to SVMs 131-132. The DVFilter component may reside on an Input Output (IO) chain through which packets are transported and processed. Any alternative and/or additional component(s) may be used.

Packet Handling Using SVMs

Packet handling may be performed by any suitable host 110A/110B/110C requiring the service provided by SVMs 131-132 according to blocks 335-385 in FIG. 3. In the following, packet handling in various scenarios will be explained: (a) prior to migration of SVM1 131 with reference to FIG. 4, (b) a switchover from SVM1 131 to SVM2 132 with reference to FIG. 5, and (c) during and after the migration of SVM1 132 with reference to FIG. 5.

(a) Prior to Migration of SVM1 131

Referring to FIG. 3 again, at 335, host-A 110A detects a packet that is destined for VM3 133. In the example in FIG. 4, first packet 430 includes inner packet 432, which further includes inner header 434 (labelled "I") and payload 436. Inner header 434 specifies source address information (IP address=IP-VM4, MAC address=MAC-VM4) associated with VM4 134, destination address information (IP-VM3, MAC-VM3) associated with VM3 133, and layer-4 information (protocol=HTTP, destination port=80, source port=80). First packet 430 also includes outer header 438 (labelled "O1") that is addressed from source (VTEP label=VTEP-B, VTEP IP=IP-B) implemented by hypervisor-B 114B to destination (VTEP label=VTEP-A, VTEP IP=IP-A) implemented by hypervisor-A 114A.

At 340 and 345 in FIG. 3, in response to determination that first packet 430 matches with packet processing rule 411 in table 410, host-A 110A determines that first packet 430 requires a service identified by (SPI=20, SI=1). In practice, host-A 110A may perform service function chaining (SFC) encapsulation by adding (SPI=20, SI=1) to a service header of first packet 430. The service header may be a Network Service Header (NSH), which may be added as extended type-length-value (TLV) of an outer header (e.g., GENEVE header). The NSH specification is maintained by the Internet Engineering Task Force (IETF) and described in Request For Comment (RFC) 8300, the content of which is incorporated herein by reference.

At 350 in FIG. 3, based on packet processing rule 411 and service identification information (SPI=20, SI=1), host-A 110A retrieves first entry 421 in table 420 and determines that SVM1 131 is associated with role=ACTIVE. At 355 in FIG. 3, since SVM1 131 is also supported by host-A 110A, outer header 438 may be removed from ingress packet 430 before inner packet 432 is forwarded to SVM1 131. Once SVM1 131 has performed the necessary packet processing, inner packet 432 may be forwarded to destination VM3 133, or another SVM in the service chain (not shown for simplicity).

(b) Switchover from SVM1 131 to SVM2 132

In practice, migration of SVM1 131 and/or SVM2 132 may be required due to various reason(s), such as load balancing, a failure at SVM1 131, etc. In the following, consider a scenario where migration of SVM1 131 from source host=host-A 110A to target host=host-B 110B is required. Conventionally, the migration will cause service disruption to VMs (e.g., VM3 133) requiring services of SVM1 131. According to examples of the present disclosure, SVM2 132 may take over the active role from SVM1 131 to reduce the likelihood of, if not avoid, service disruption during the migration of SVM1 131.

At 365 in FIG. 3, host-A 110A determines that a switchover is required to facilitate a migration of SVM1 131. The determination may be based on a notification received by host-A 110A, such as by registering for function callbacks for the events that trigger modification to table 410/420, etc. The notification may be received from SVM1 131, another module implemented by hypervisor-A 114A on source host-A 110A, or SDN controller 170. See example migration at 510 in FIG. 5.

At 370 in FIG. 3, in response to determination that the switchover is required, host-A 110A updates first entry 421 to associate SVM1 131 with role=STANDBY instead of ACTIVE. Further, host-A 110A updates second entry 422 to associate SVM2 132 with new role=ACTIVE. This way, SVM2 132 may assume the ACTIVE role during the migration of SVM1 131 to provide service continuity. See example updates to SPI table 420 at 512 in FIG. 5. In practice, the "role" field in entry 421/422 may be represented using a flag that may be updated from ACTIVE=1 to STANDBY=0, or vice versa, using an atomic bit change operation.

(c) Migration of SVM1 131

After the switchover, host-A 110A may redirect any subsequent packet requiring the service associated with (SPI=20, SI=1) to SVM2 132, instead of SVM1 131 according to blocks 335-350 and 360. For example in FIG. 5, host-A 110A may detect second packet 520 that encapsulates inner packet 522 with first outer header 528 (labelled "O1"). Inner packet 522 includes inner header 524 (labelled "I") and payload 526 (labelled "P"). Similar to first packet 430 in FIG. 4, inner header 524 specifies source address information (IP address=IP-VM4, MAC address=MAC-VM4) associated with VM4 134, destination address information (IP-VM3, MAC-VM3) associated with VM3 133, and layer-4 information (protocol=HTTP, destination port=80, source port=80).

In response to detecting second packet 520, host-A 110A identifies matching rule 411 and determines that second packet 520 requires processing according to a service associated with (SPI=20, SI=1). Next, host-A 110A identifies SVM2 132 to be associated with role=ACTIVE based on updated second entry 422 in table 420. As such, host-A 110A generates and sends third packet 530 to SVM2 132 supported by host-C 110C according to block 360 in FIG. 3. For example, third packet 530 in FIG. 5 includes the same inner packet 522, and second outer header 532 (labelled "O2") that is addressed from source VTEP-A (e.g., VTEP IP=IP-A) implemented by hypervisor-A 114A to destination VTEP-C (e.g., VTEP IP=IP-C) implemented by hypervisor-C 114C. Once SVM2 132 has performed the necessary packet processing, inner packet 522 may be forwarded to destination VM3 133, or another SVM in the service chain (not shown for simplicity).

Referring to FIG. 3 again, at 380 and 385, in response to detecting completion of the migration of SVM1 131, host-A 110A updates reachability information associated with SVM1 131. In particular, first entry 421 in table 420 may be updated to associate SVM1 131 with target host=host-B 110B to which SVM1 131 is migrated, such as by replacing VTEP information (VTEP-A, IP-A) with (VTEP-B, IP-B). Updated first entry 421 is shown in FIG. 5, i.e., (ID=SVM1, role=STANDBY, VNI=100, MAC address=MAC-1, VTEP label=VTEP-B, VTEP IP=IP-B). This way, when reassigned with the role=ACTIVE, SVM1 131 will be reachable based on updated first entry 421.

The detection at block 380 may be performed using any suitable approach. Similar to block 365, the detection may involve receiving a notification associated with the completion of migration, such as by registering for function callbacks for the events that trigger modification to table 410/420, etc. The notification may be received from SVM1 131 once it has been migrated, any suitable module(s) implemented by target host-B 110C, or SDN controller 170. Although explained using example ingress packets received host-A 110A, it should be understood that examples of the present disclosure are applicable to both ingress and egress packets.

Migration of Multiple SVMs

In the examples in FIG. 3 to FIG. 5, SVM1 131 is migrated while SVM2 132 remains on host-C 110C. In practice, there may be various scenarios where migration of both SVMs 131-132 is required, such as they are supported by the same hypervisor on the same host, etc. An example will be described using FIG. 6. FIG. 6 is a schematic diagram illustrating example packet handling during migration of multiple service virtualized computing instances 131-132 in SDN environment 100.

In the example in FIG. 6, SVM1 131 and SVM2 132 are both supported by host-B 110B. Referring to table 610 accessible by host-A 110A, first reachability information (see 611 in FIG. 6) associates SVM1 131 with role=ACTIVE and VTEP information (VTEP-B, IP-B). Second reachability information (see 612 in FIG. 6) associates SVM2 132 with role=STANDBY and VTEP information (VTEP-B, IP-B).

To facilitate migration of both SVM1 131 and SVM2 132 (e.g., for load balancing purposes), SVM2 132 associated with role=STANDBY may be migrated before SVM1 131. This way, SVM1 131 may continue to provide the service while SVM2 132 is being migrated from source host=host-B 110B to target host=host-C 110C (see 620 in FIG. 6). Once SVM2 132 is migrated, updated table 630 specifies reachability information (see 631 in FIG. 6) that associates SVM2 132 with role=STANDBY and VTEP information (VTEP-C, IP-C) associated with target host=host-C 110C.

After SVM2 132 is migrated, SVM1 131 may be migrated from source host=host-B 110B to target host=host-C 110C (see 640 in FIG. 6) or any alternative target host. Similar to the examples in FIG. 5, host-A 110A may determine that a switchover is required to facilitate the migration of SVM1 131, such as based on a notification (e.g., function callback) associated with the migration. In response, host-A 110A may update the reachability information (see 651-652 in updated table 650) to associate SVM2 132 with role=ACTIVE and SVM1 131 with role=STANDBY.

Packet handling during the migration of SVM1 131 has been explained using blocks 335-385 and FIGS. 1-5, the full explanation of which will not be repeated here for brevity. Once SVM1 131 is migrated, updated table 650 specifies reachability information (see 651 in FIG. 6) that associates SVM1 131 with VTEP information (VTEP-C, IP-C) associated with target host=host-C 110C. In this case, SVM2 132 may continue to operate in the ACTIVE role.

It should be understood that examples of the present disclosure do not necessitate the use of service function chaining, service headers, etc. Depending on the desired implementation, the NSH specification and service identification information=(SPI, SI) described using FIGS. 3-6 may or may not be implemented. For example, since SVMs 131-132 are generally addressable entities, rule 411 may be mapped to entries 421-422 in FIG. 4 without using (SPI, SI). This way, examples of the present disclosure may be implemented in any suitable layer-2 or layer-3 networks that do not rely on a service plane or service headers.

Container Implementation

Although explained using VMs 131-135, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-135. For example, SVMs 131-132 may be implemented using containers.

Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs. Reachability information discussed using FIG. 1 to FIG. 6 may also include container information, such as container MAC address information, IP address information, etc.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. According to the examples in FIG. 1 to FIG. 6, computer system(s) capable of performing as SDN controller 170, SDN manager 180 and hosts 110A-C may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to perform packet handling during service virtualized computing instance migration in a software-defined networking (SDN) environment that includes a source host and a target host, the method comprising:
 configuring first reachability information to associate a first service virtualized computing instance with an active role and the source host supporting the first service virtualized computing instance;
 configuring second reachability information to associate a second service virtualized computing instance with a standby role, wherein both the first service virtualized computing instance and second service virtualized computing instance are configured to provide a service;
 in response to determining that a switchover is required to facilitate a migration of the first service virtualized computing instance from the source host to the target host and prior to the migration, updating the first reachability information to associate the first service virtualized computing instance with the standby role, and the second reachability information to associate the second service virtualized computing instance with the active role;
 based on the updated second reachability information, forwarding a packet that requires the service to the second service virtualized computing instance; and
 in response to detecting a completion of the migration, updating the first reachability information to associate the first service virtualized computing instance with the target host instead of the source host.

2. The method of claim 1, wherein determining that the switchover is required comprises:
 receiving a notification associated with the migration from the first service virtualized computing instance, the source host, or a manager.

3. The method of claim 1, wherein configuring the first reachability information comprises:
 configuring the first reachability information to specify virtual tunnel endpoint (VTEP) information associated with the source host supporting the first service virtualized computing instance prior to the migration.

4. The method of claim 3, wherein updating the first reachability information comprises:
 updating the first reachability information to specify VTEP information associated with the target host supporting the first service virtualized computing instance after the migration.

5. The method of claim 1, wherein configuring the first reachability information and the second reachability information respectively comprises:
 configuring the first reachability information to associate the first service virtualized computing instance with service identification information associated with the service provided by both the first service virtualized computing instance and second service virtualized computing instance; and
 configuring the second reachability information to associate the second service virtualized computing instance with the service identification information.

6. The method of claim 5, wherein forwarding the packet comprises:
 matching the packet with a packet processing rule associated with the service identification information; and
 retrieving the second reachability information based on the packet processing rule and service identification information.

7. The method of claim 1, further comprising:
 prior to the migration of the first service virtualized computing instance, detecting a completion of a migration of the second service virtualized computing instance associated with the standby role; and
 in response to detecting the completion of the migration of the second service virtualized computing instance, updating the second reachability information to associate the second service virtualized computing instance with a second target host to which the second service virtualized computing instance is migrated.

8. A non-transitory computer-readable storage medium that includes a set of instructions which, in response to execution by a processor of a computer system, cause the processor to perform a method of packet handling during service virtualized computing instance migration in a software-defined networking (SDN) environment that includes a source host and a target host, wherein the method comprises:
 configuring first reachability information to associate a first service virtualized computing instance with an active role and the source host supporting the first service virtualized computing instance;
 configuring second reachability information to associate a second service virtualized computing instance with a standby role, wherein both the first service virtualized computing instance and second service virtualized computing instance are configured to provide a service;
 in response to determining that a switchover is required to facilitate a migration of the first service virtualized computing instance from the source host to the target host and prior to the migration, updating the first reachability information to associate the first service virtualized computing instance with the standby role, and second reachability information to associate the second service virtualized computing instance with the active role;
 based on the updated second reachability information, forwarding a packet that requires the service to the second service virtualized computing instance; and
 in response to detecting a completion of the migration, updating the first reachability information to associate the first service virtualized computing instance with the target host instead of the source host.

9. The non-transitory computer-readable storage medium of claim 8, wherein determining that the switchover is required comprises:
 receiving a notification associated with the migration from the first service virtualized computing instance, the source host, or a manager.

10. The non-transitory computer-readable storage medium of claim 8, wherein configuring the first reachability information comprises:
 configuring the first reachability information to specify virtual tunnel endpoint (VTEP) information associated with the source host supporting the first service virtualized computing instance prior to the migration.

11. The non-transitory computer-readable storage medium of claim 10, wherein updating the first reachability information comprises:

updating the first reachability information to specify VTEP information associated with the target host supporting the first service virtualized computing instance after the migration.

12. The non-transitory computer-readable storage medium of claim 8, wherein configuring the first reachability information and the second reachability information respectively comprises:
    configuring the first reachability information to associate the first service virtualized computing instance with service identification information associated with the service provided by both the first service virtualized computing instance and second service virtualized computing instance; and
    configuring the second reachability information to associate the second service virtualized computing instance with the service identification information.

13. The non-transitory computer-readable storage medium of claim 12, wherein forwarding the packet comprises:
    matching the packet with a packet processing rule associated with the service identification information; and
    retrieving the second reachability information based on the packet processing rule and service identification information.

14. The non-transitory computer-readable storage medium of claim 8, wherein the method further comprises:
    prior to the migration of the first service virtualized computing instance, detecting a completion of a migration of the second service virtualized computing instance associated with the standby role; and
    in response to detecting the completion of the migration of the second service virtualized computing instance, updating the second reachability information to associate the second service virtualized computing instance with a second target host to which the second service virtualized computing instance is migrated.

15. A computer system configured to perform a method of packet handling during service virtualized computing instance migration in a software-defined networking (SDN) environment, the computer system comprising:
    a processor; and
    a non-transitory computer-readable medium having stored thereon instructions that, in response to execution by the processor, cause the processor to:
        configure first reachability information to associate a first service virtualized computing instance with an active role and a source host supporting the first service virtualized computing instance;
        configure second reachability information to associate a second service virtualized computing instance with a standby role, wherein both the first service virtualized computing instance and second service virtualized computing instance are configured to provide a service;
        in response to determination that a switchover is required to facilitate a migration of the first service virtualized computing instance from the source host to a target host and prior to the migration, update the first reachability information to associate the first service virtualized computing instance with the standby role, and the second reachability information to associate the second service virtualized computing instance with the active role;
        based on the updated second reachability information, forward a packet that requires the service to the second service virtualized computing instance; and
        in response to detection of a completion of the migration, update the first reachability information to associate the first service virtualized computing instance with the target host instead of the source host.

16. The computer system of claim 15, wherein the instructions for the determination that the switchover is required cause the processor to:
    receive a notification associated with the migration from the first service virtualized computing instance, the source host, or a manager.

17. The computer system of claim 15, wherein the instructions to cause the processor to configure the first reachability information cause the processor to:
    configure the first reachability information to specify virtual tunnel endpoint (VTEP) information associated with the source host supporting the first service virtualized computing instance prior to the migration.

18. The computer system of claim 17, wherein the instructions to cause the processor to update the first reachability information cause the processor to:
    update the first reachability information to specify VTEP information associated with the target host supporting the first service virtualized computing instance after the migration.

19. The computer system of claim 15, wherein the instructions to cause the processor to configure the first reachability information and the second reachability information respectively cause the processor to:
    configure the first reachability information to associate the first service virtualized computing instance with service identification information associated with the service provided by both the first service virtualized computing instance and second service virtualized computing instance; and
    configure the second reachability information to associate the second service virtualized computing instance with the service identification information.

20. The computer system of claim 19, wherein the instructions to cause the processor to forward the packet cause the processor to:
    match the packet with a packet processing rule associated with the service identification information; and
    retrieve the second reachability information based on the packet processing rule and service identification information.

21. The computer system of claim 15, wherein the instructions further cause the processor to:
    prior to the migration of the first service virtualized computing instance, detect a completion of a migration of the second service virtualized computing instance associated with the standby role; and
    in response to detection of the completion of the migration of the second service virtualized computing instance, update the second reachability information to associate the second service virtualized computing instance with a second target host to which the second service virtualized computing instance is migrated.

* * * * *